United States Patent [19]

Rangwala et al.

[11] Patent Number: 4,716,921

[45] Date of Patent: Jan. 5, 1988

[54] FILLER STERILIZATION SYSTEM

[75] Inventors: Badruddin K. Rangwala, Farmington Hills; Kenneth P. McDonald, Livonia, both of Mich.

[73] Assignee: Ex-Cell-O Corporation, Walled Lake, Mich.

[21] Appl. No.: 851,173

[22] Filed: Apr. 14, 1986

[51] Int. Cl.[4] .................................................. F16K 3/36

[52] U.S. Cl. ................................ 137/241; 137/624.13; 137/624.18; 137/614.13; 251/279; 222/148

[58] Field of Search .............. 137/240, 624.13, 624.18, 137/241, 614.13; 251/279; 222/148

[56] References Cited

U.S. PATENT DOCUMENTS

| | | | |
|---|---|---|---|
| 1,954,261 | 4/1934 | Pierce | 137/241 |
| 1,987,865 | 1/1935 | North | 137/624.18 |
| 3,128,986 | 4/1964 | Miller et al. | 251/279 |
| 3,237,640 | 3/1966 | Whitlock et al. | 137/624.18 |
| 3,650,678 | 3/1972 | Hansen | 137/241 |
| 3,913,621 | 10/1975 | Damratowski | 137/630.2 |
| 4,090,475 | 5/1978 | Kwan | 222/148 |
| 4,194,524 | 3/1980 | Wicke | 137/240 |
| 4,527,585 | 7/1980 | Mirabile | 222/148 |

*Primary Examiner*—A. Michael Chambers
*Attorney, Agent, or Firm*—John P. Moran

[57] ABSTRACT

A filler sterilization system including an inlet valve, a main valve, an outlet valve, a linkage system therebetween and a cam and follower arrangement for actuating the linkage system to move the three valves into three operating positions. The three positions are the normally closed and open positions for dispensing a liquid product into a carton, and a third position for steam sterilization of the filler system. The outlet valve in the latter position is such that a predetermined back pressure is maintained during the sterilization operation.

8 Claims, 8 Drawing Figures

FILLER STERILIZATION SYSTEM

TECHNICAL FIELD

This invention relates generally to filler mechanisms for liquid products and, more particularly, to a sterilization system for such fillers.

BACKGROUND ART

Heretofore, in the usual steam sterilization process for a liquid filler system, it has been customary to apply a suitable adapter at the discharge end of the valve unit in order to maintain sufficient back pressure of steam in the system to effectuate the proper sterilization temperature. Once such a sterilization process is completed, there is not only some difficulty in removing the heated adapter, but also in maintaining sterility on and around the valve and discharge surfaces and on any internal surfaces exposed to the atmosphere.

DISCLOSURE OF THE INVENTION

Accordingly, a general object of the invention is to provide an improved filler design and steam sterilization system therefor, wherein the use of an accompanying adapter is not necessary.

Another object of the invention is to provide a filler and a steam sterilization system therefor, wherein the discharge valve is of a design such that it assumes a position other than the normal closed and open positions for steam sterilization purposes, and is effective in this third position without an adapter being used therewith.

A further object of the invention is to provide a filler valve arrangement embodying a valve and ring seat concept adapted to providing a predetermined back pressure for the steam during the sterilization process.

These and other objects and advantages will be more apparent when reference is made to the following drawings and the accompanying description.

BEST MODE OF CARRYING OUT THE INVENTION

Figure 1A:
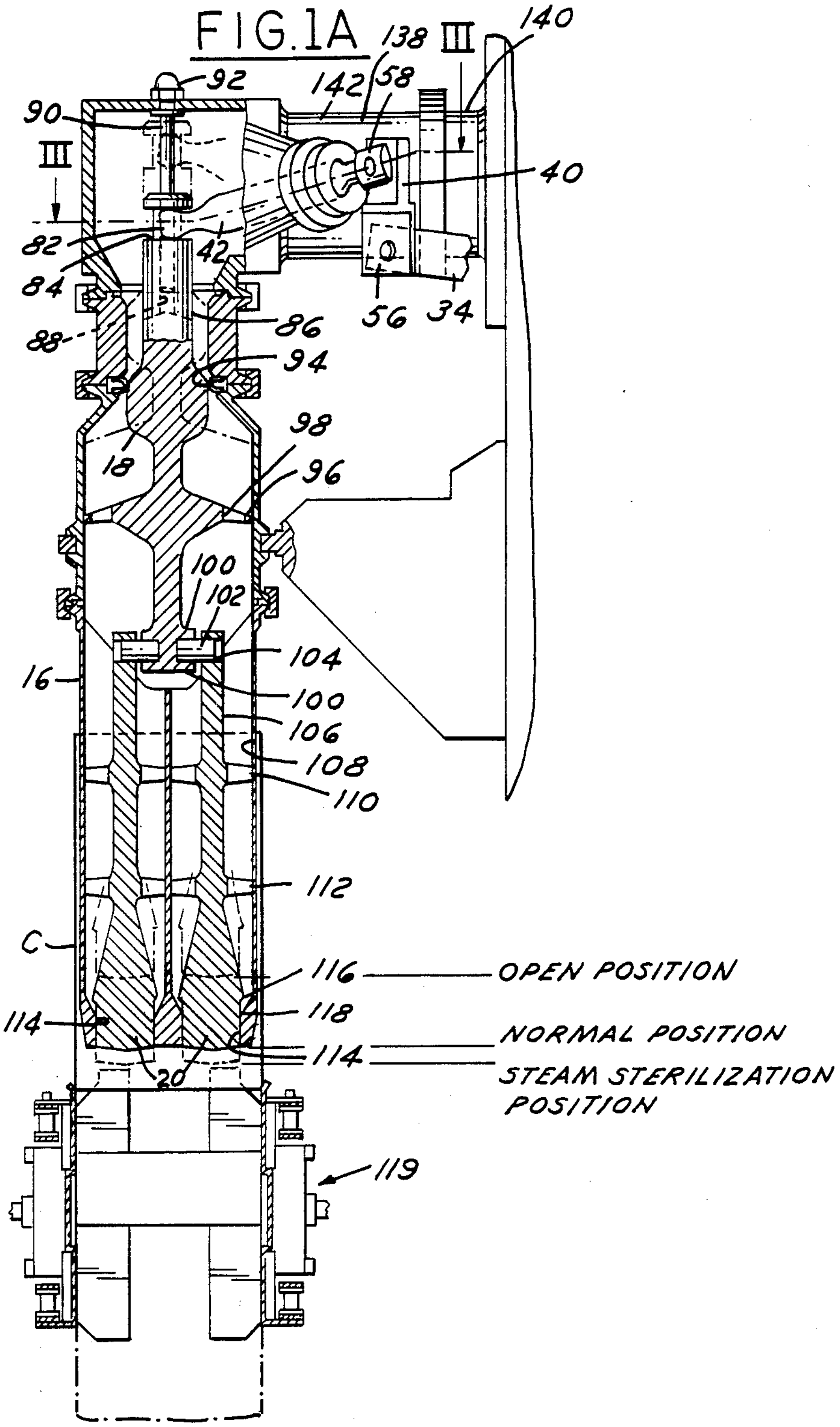
FIGS. 1A and 1B are a front elevational view, in partial cross section, of a filler system embodying the invention.
Figure 1B:
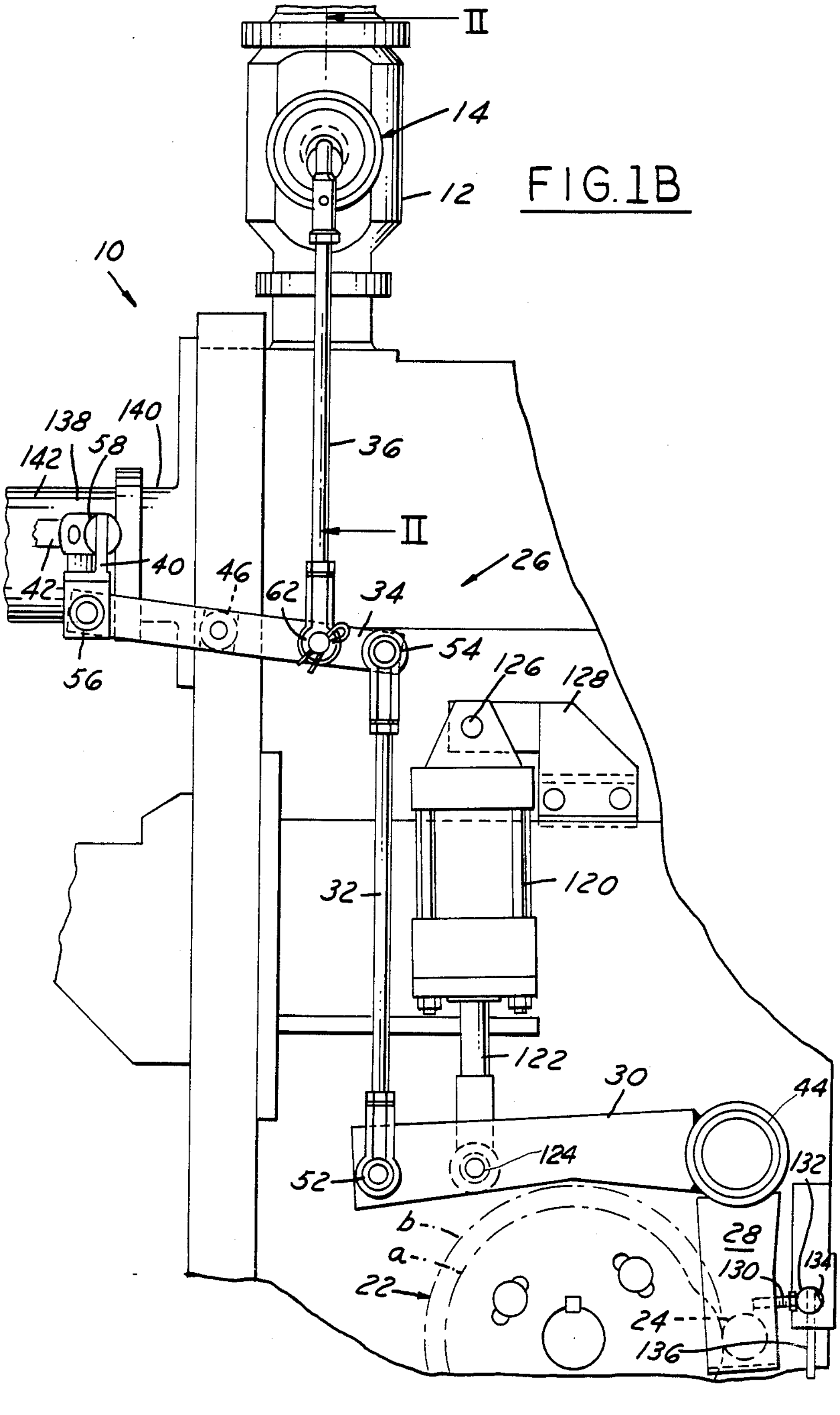

Referring now to the drawings in greater detail, FIGS. 1A and 1B illustrate a liquid filling and steam sterilization system 10 including an inlet housing 12 having an inlet valve 14 therein, an outlet housing 16 having a main valve 18 and dual outlet valves 20 therein. An external actuator, such as a cam 22 and follower 24, actuates the valves 14 and 18 through a suitable linkage system 26.

The linkage system 26 to the respective valves 14 and 18 includes a series of pivotally interconnected linkage members 28, 30, 32, 34, 36, 40, (FIG. 1B), 38 (FIG. 2), and 42 (FIG. 3), operatively connected to fixed pivot points 44 and 46 (FIG. 1B), 48 (FIG. 2), and 50 (FIG. 3) as follows: the fixed point 44 is connected to adjacent ends of the linkage members 28 and 30 such that the members 28 and 30 are substantially at right angles to one another; the fixed point 46 is operable intermediate the ends of the linkage member 34; the fixed point 48 is operable intermediate the ends of the linkage member 38 at an inlet to the housing 12 for actuation of the inlet valve 14; and the fixed point 50 is operable intermediate the ends of the linkage member 42 at an inlet to the housing 16 for actuation of the main and capillary valves 18 and 20, respectively.

Pivot pins 52, 54, 56 and 58 (FIG. 1B) and 60 (FIG. 2) interconnect the members 30 and 32, 32 and 34, 34 and 40, 40 and 42, and 36 and 38, respectively, and a pivot pin 62 connects and end of the member 36 to the member 34 at a point intermediate the pivot pin 54 and the fixed pivot point 46.

Suitable seals 64 (FIG. 2) and 60 (FIG. 3) serve to seal the fixed pivot points 48 and 50 at openings 68 and 70 into the respective inlet and outlet housings 12 and 16.

Figure 2:
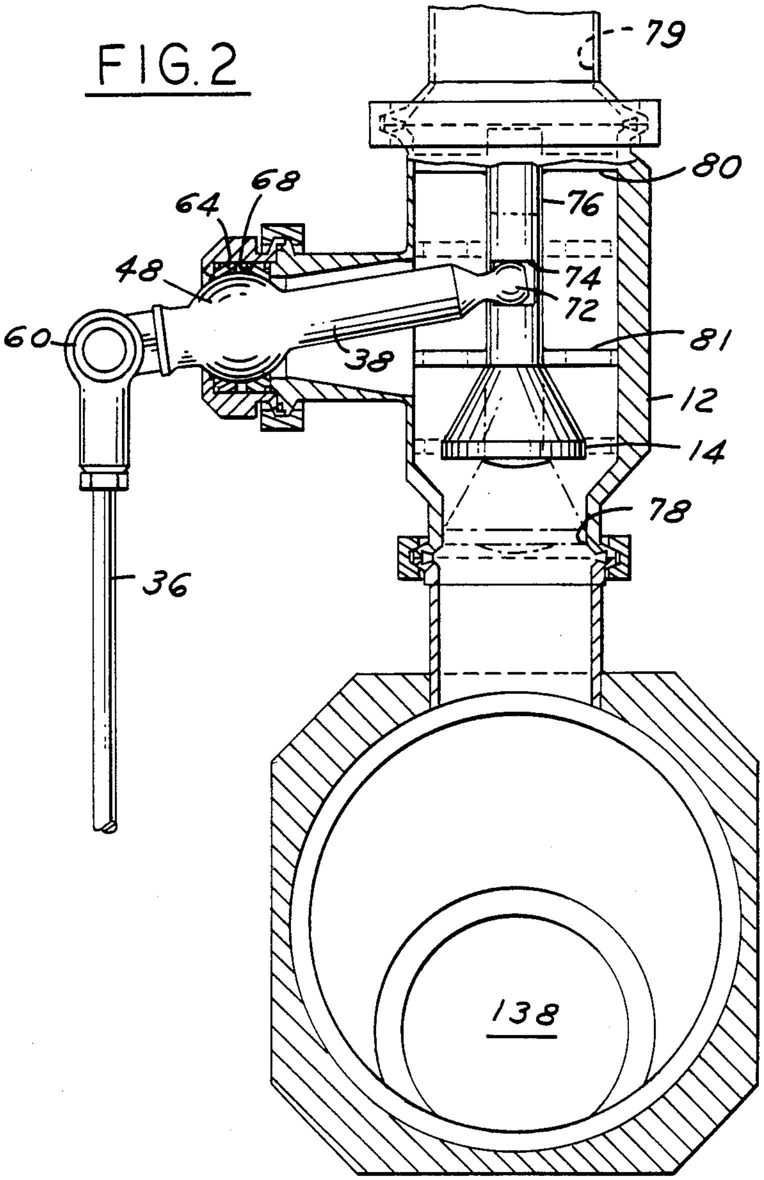
FIG. 2 is an enlarged view taken along the plane of the line 2—2 of FIG. 1B, and looking in the direction of the arrows.

Referring now to FIG. 2, a trunnion 72 formed on the inner end of the linkage member 38 is pivotally connected in a recess 74 formed in a stem 76 of the valve 14, to move the latter with respect to a valve seat 78 to control the inlet of a liquid product through an upper opening 79 from a suitable external tank (not shown). A pair of guide flanges 80 and 81 are formed at spaced intervals along the length of the stem 76.

Figure 3:
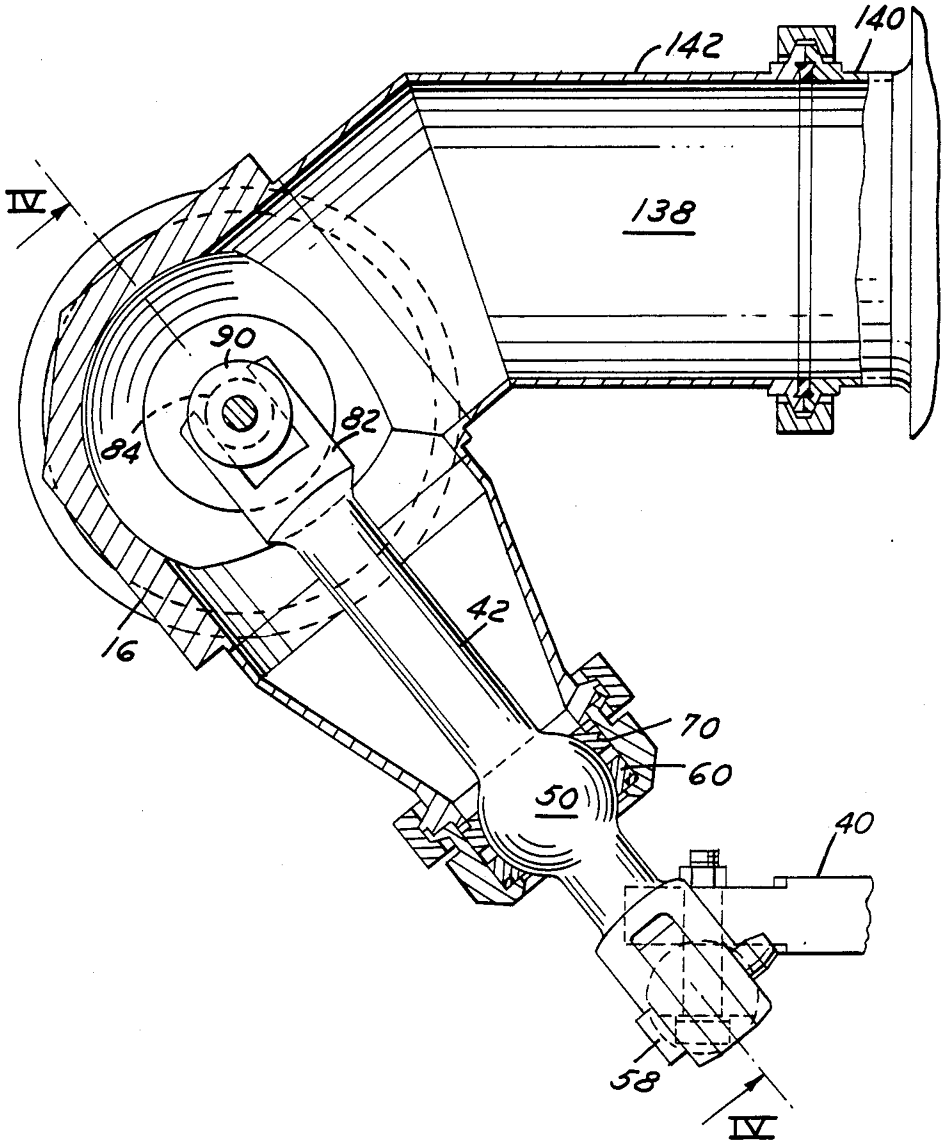
FIG. 3 is an enlarged cross sectional view taken along the plane of the line 3—3 of FIG. 1A, and looking in the direction of the arrows.
Figures 4, 5, 6, 7, 8:
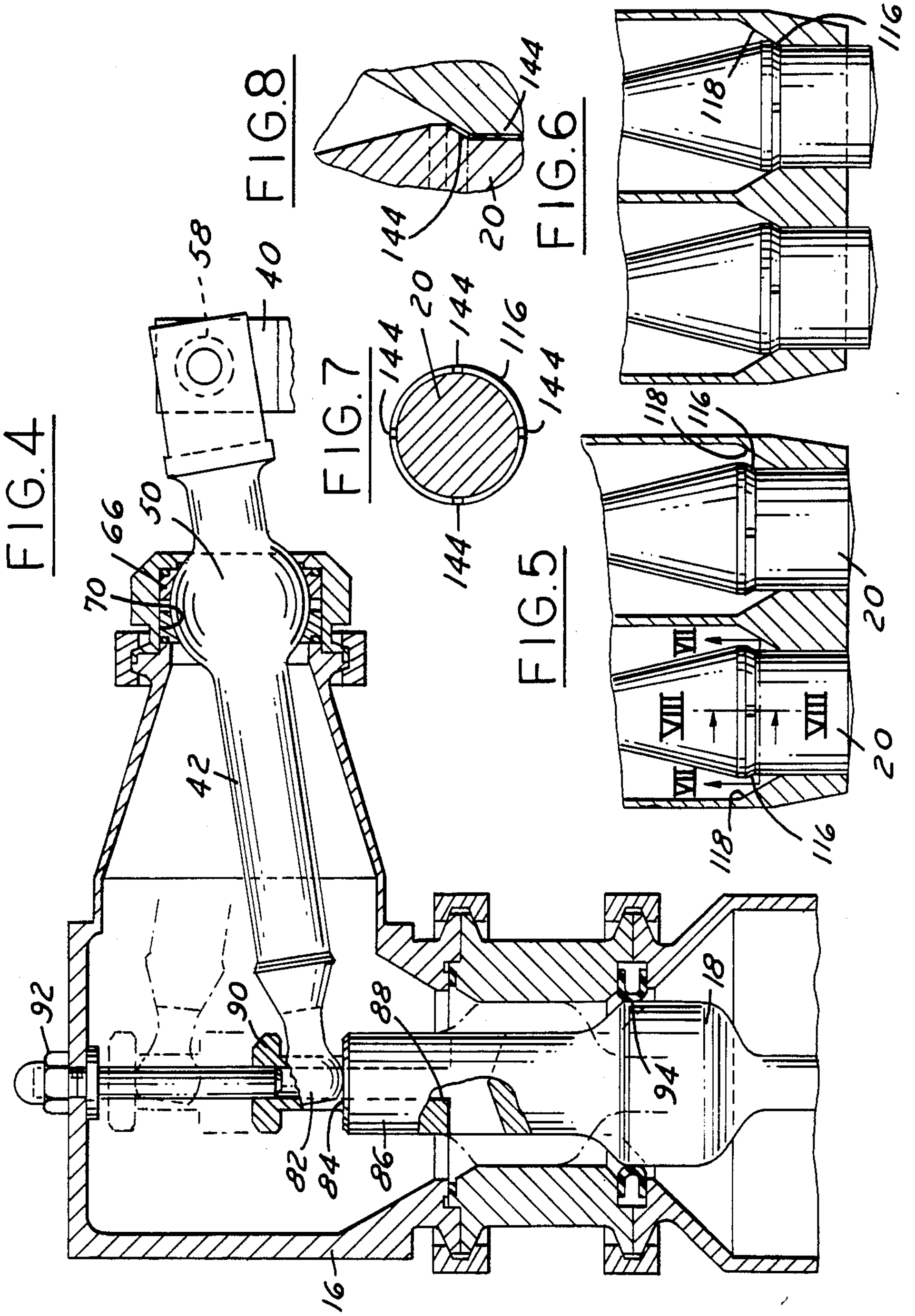
FIG. 4 is a cross sectional view taken along the plane of the line 4—4 of FIG. 3, and looking in the direction of the arrows.
FIGS. 5 and 6 are enlarged views of a portion of the FIG. 1A structure in different operational positions.
FIG. 7 is a cross sectional view taken along the plane of the line 7—7 of FIG. 5, and looking in the direction of the arrows.
FIG. 8 is a cross sectional view taken along the plane of the line 8—8 of FIG. 5, and looking in the direction of the arrow.

As shown in FIGS. 3 and 4, a trunnion 82 formed on the inner end of the linkage member 42 is pivotally connected in a recess 84 formed in a stem 86 operatively connected to the valves 18 and 20, as will be explained. The stem 86 has a central opening 88 formed therein for sliding cooperation with a pin member 90 secured by fastener means 92 to a top surface of the housing 16. The stem 86 is flared out to form the main valve 18 which cooperates with an annular valve seat 94.

Referring once again to FIG. 1A, it is noted that below the valve 18 the stem 86 flares out once again to form a cylindrical guide 96 within the housing 16 and having openings 98 formed therethrough. A pair of spaced flanges 100 are formed on the bottom end of the stem 86. Oppositely disposed extension pins 102 are secured by any suitable means between the flanges 100, with their extended ends mounted in openings 104 formed in respective stems 106.

As may be noted in FIG. 1A, the housing 16 is formed at its lower end to include dual side-by-side cylindrical passages 108. A pair of guide flanges 110 and 112 are formed at spaced intervals along the length of each stem 106. The outlet valves 20 are formed on the lower ends of respective stem 106. The valves 20 are adapted to having a capillary seal fit with respective openings 114. A frusto-conical seat 116 is formed at the upper edge of each opening 114. An annular mating surface 118 for each seat 116 is formed on each outlet valve 20.

It should be noted that the dual cylindrical passages 108 are adaptable to a carton-to-be-filled having a rectangular cross section. Accordingly, if the carton-to-be-filled were square or circular in cross section, only one passage 108 would be required, in which case one stem 106 and its associated parts could be an extension of, or a direct connection to, the lower end of the stem 86.

A conventional guiding and "bottom-up" lifting mechanism 119 for a carton C is shown at the bottom of FIG. 1A. As indicated, each carton is lifted to mount around the lower end portion of the outlet housing 16 and then lowered as it is being filled, with the valves 18 and 20 in their open positions.

The cam 22 (FIG. 1B) bears an outer surface which varies from a smaller to a larger diameter, as represented by circles a and b, for cooperation with the follower 24. The follower 24 is caused to follow the cam 22 surface a-b by a cylinder 120 and its cylinder rod 122, the latter being pivotally secured by a pivot pin 124 to the linkage member 30 for reciprocal movement therewith, and the former being connected by a pivot pin 126 to a fixed bracket 128. A stop pin 130 is secured to a side of the linkage member 28 for a purpose to be described. For use during the steam sterilization cycle of the system 10, a flat surface 134 is formed on the periphery of the rod member 132 for cooperation with the cylinder 120 in one operational position, as will be explained. A lever 136 is secured to the rod member 132 for rotating the latter so as to be engaged by the stop pin 130 for a purpose to be described.

Operation

For the liquid filling cycle, as the cam 22 is rotated in response to actuation coordinated with the indexing operation of forming, filling and sealing machine on which the filler system 10 is mounted, the follower 24 follows the changing surface a,b to move, via the linkage system 26, the trunnion 72 between two positions apparent in FIG. 2, and the trunnon 82 between the two positions indicated in FIG. 4. Such movements serve to move the respective valves 14 and 18 into or out of engagement with their respective seats 78 and 94. While the inlet valve 14 is in the upper position, a measured quantity of liquid will be drawn through the inlet 80, past the valve 14/78 and into a chamber 138 (FIG. 2) formed by the interconnection of cylindrical chambers 140 and 142, an external pump (not shown) being located to the right of the chamber 140 in FIG. 1A. At this point, the valve 18/94 is closed by virtue of the fact that, as the linkage member 34 is pivoted in a clockwise direction about the fixed pivot point 46 by the downward movement of the linkage member 32, the linkage member 36 is pulled downward, thereby lifting the valve 14 and, simultaneously, the linkage member 40 is raised, thereby lowering the valve 18. At the same time, the outlet valves 20 will be in the closed position, identified as "normal position" in FIG. 1A.

During the carton fill time cycle, the valves 18 and 20 will assume their respective open positions, and the inlet valve 14 its closed position, with the selected measured volume of liquid product being discharged past the outlet valves 20/114 by virtue of the action of the external pump. Thereafter, the system fill and discharge cycles are repeated.

Between liquid filling runs it is important to sterilize the system 10. This is accomplished by a steam sterilization process wherein steam is supplied from an external source (not shown) into the stream via the upper opening 79 (FIG. 2) in lieu of a liquid product after the latter has been cleared from the system. Specifically, the rod member 132 is rotated by use of the lever 136 until the flat surface 134 is positioned adjacent the stop pin 130. The cylinder 120 is actuated to cause the levers 30 and 28 to rotate about the pivot pin 44 in a counterclockwise direction, urging the stop pin 130 into contact with the flat surface 134. The resultant movements of the corresponding linkage members in the linkage system 26 cause (1) the valve 14 to open further than the liquid filling open position, (2) the main valve 18 to move below the annular seat 94, and (3) the outlet valves 20 to move downwardly into the steam sterilization position (FIG. 1A). The latter movement brings the annular surface 118 into engagement with the frusto-conical seat 116, thereby providing a back pressure to the stream throughout the housings 16 and 12 and the interconnecting chamber 138. The precise amount of back pressure is regulated by the controlled escape of steam through spaced grooves 144 (FIG. 7) formed across the annular surface 116 and the capillary seal relationship (FIG. 8) between the outlet valve 20 and the surrounding cylindrical wall 114. Upon completion of the steam sterilization of the system, the rod member 132 is rotated back to its original position, urging the follower 24 and the associated linkage system 26 to positions which return the valves 14, 18 and 20 to their respective normal or rest positions. The cylinder 120 is then actuated to maintain the follower 24 in engagement with the cam 22, ready to repeat the filling process.

Industrial Applicability

It should be apparent that the invention provides a carton liquid filling system having improved means for alternately filling the system with a measured volume of liquid, discharging the measured volume of liquid into cartons, and filling the system with steam and providing a predetermined back pressure thereto to sterilize the system.

While but one embodiment of the invention has been shown and described, other modifications thereof are possible within the scope of the following claims.

The embodiments of the invention in which an exclusive property or privilege is claimed are defined as follows:

1. A combined liquid filling and steam sterilization system comprising fluid conduit means having an inlet valve, a main liquid flow control valve, in series, respectively, an outlet valve, and a linkage means for (1) opening said inlet valve to receive a liquid product and closing said main and outlet valves in a first position, (2) closing said inlet valve and opening said main and outlet valves to discharge said liquid product in a second position, and (3) opening said inlet and main valves and closing said outlet valve so as to receive steam into the system in a third position from an external source, said outlet valve including bleed-off means for providing a predetermined back pressure via bleeding off of said steam in a controlled manner for sterilization purposes.

2. The system described in claim 1, and cam and follower means for moving said linkage means.

3. The system described in claim 2, wherein said linkage means includes common linkage members 28,30,32 and 34 operatively interconnected in series, linkage members 36 and 38 to the inlet valve, and linkage members 40 and 42 to the main and outlet valves, with each of the members 36 and 40 connected to the member 34, and the member 28 operatively connected to the follower means.

4. The system described in claim 3, and a first fixed pivot point interconnecting the members 28 and 30 in substantially an "L"-shaped configuration, the members 30 and 32 being pivotally interconnected at respective ends thereof, the members 32 and 34 being pivotally interconnected at respective ends thereof, a second fixed pivot point intermediate the ends of the member 34, the members 34 and 40 being pivotally interconnected at respective ends thereof, the members 40 and 42 being pivotally interconnected at the ends thereof, a third fixed pivot point intermediate the ends of the member 42, the member 36 being pivotally connected at one end thereof to the member 34 at a point intermediate the second fixed pivot point and the end with the pivotal connection to the member 32, the members 36 and 38 being pivotally connected at respective ends thereof, and a fourth fixed pivot point intermediate the ends of the member 38.

5. The system described in claim 3, and means operatively connected to the linkage members 28 and 30 to move the member 28 away from the follower means to effectuate movement of the respective valves to their number (3) operational positions.

6. The system described in claim 1, wherein the bleed-off means includes a plurality of orifices formed through the outlet valve, and a capillary seal fit between the outlet valve and an adjacent wall surface.

7. The system described in claim 1, and an annular seat for cooperation with said main liquid flow control valve, wherein the opening position of the main liquid flow control valve is respectively above and below the annular seat for the second and third operational positions.

8. The system described in claim 1, wherein the closed positions for the outlet valve are in different locations for the second and third operational positions.

* * * * *